H. L. BROWN.
WRAPPING MACHINE.
APPLICATION FILED OCT. 26, 1916.
1,235,547.
Patented Aug. 7, 1917.
6 SHEETS—SHEET 6.
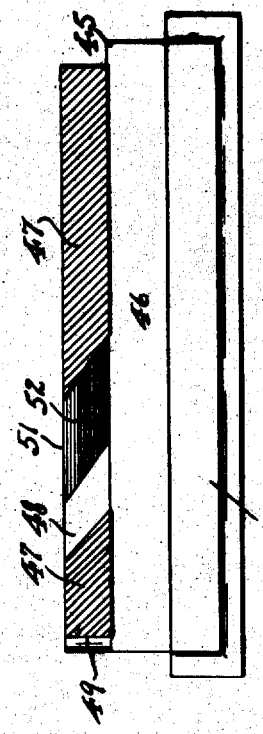
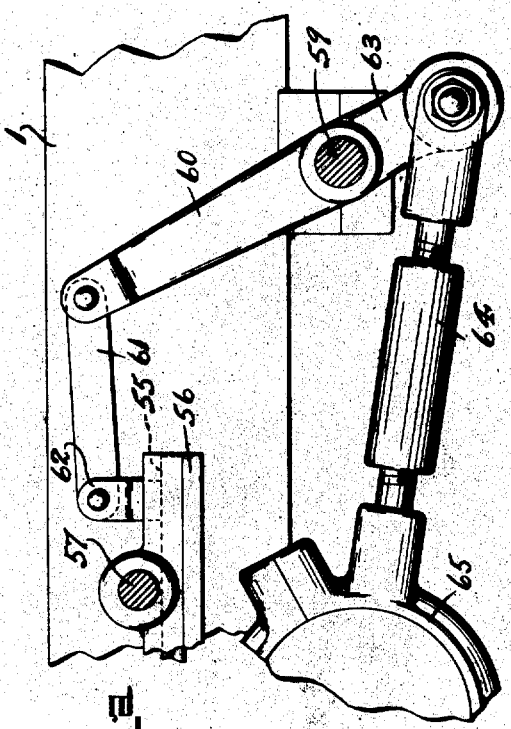
WITNESSES:
INVENTOR
Harry L. Brown,
BY
ATTORNEYS

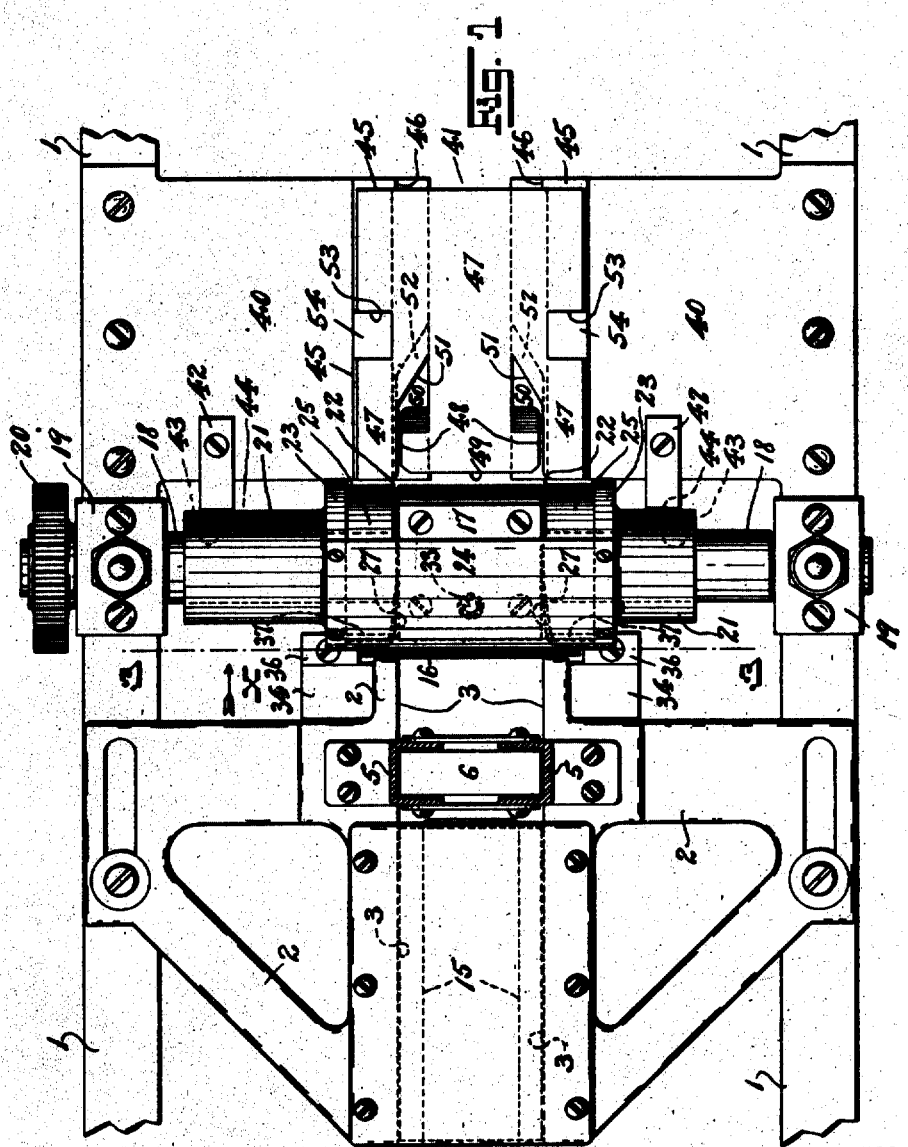

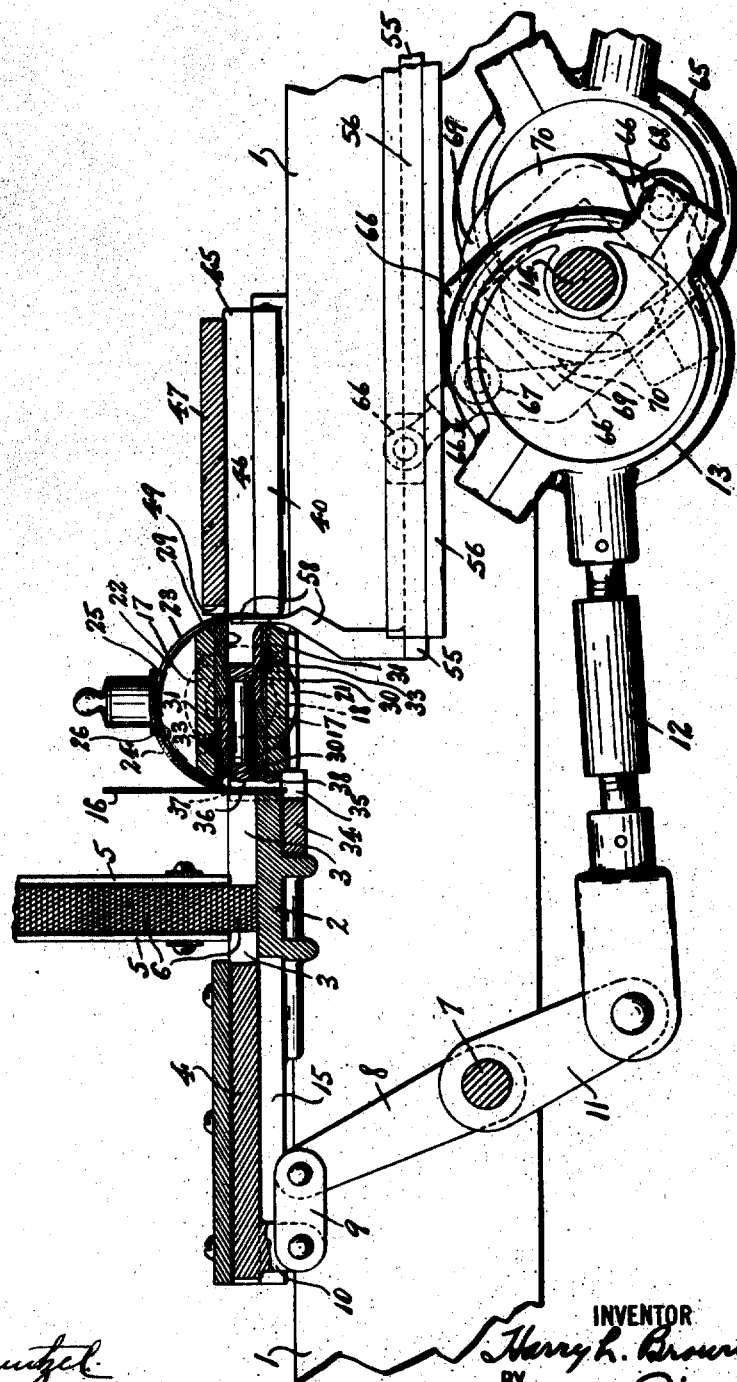

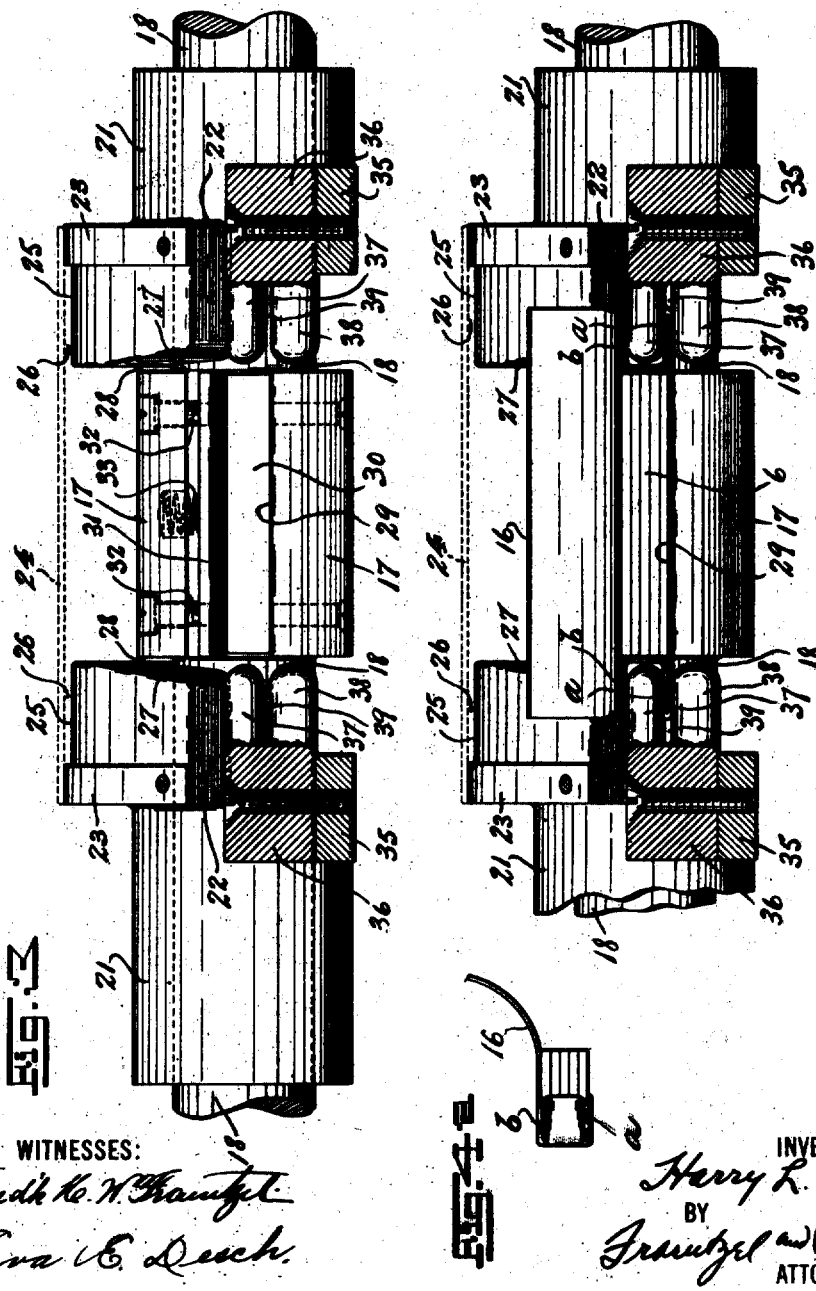

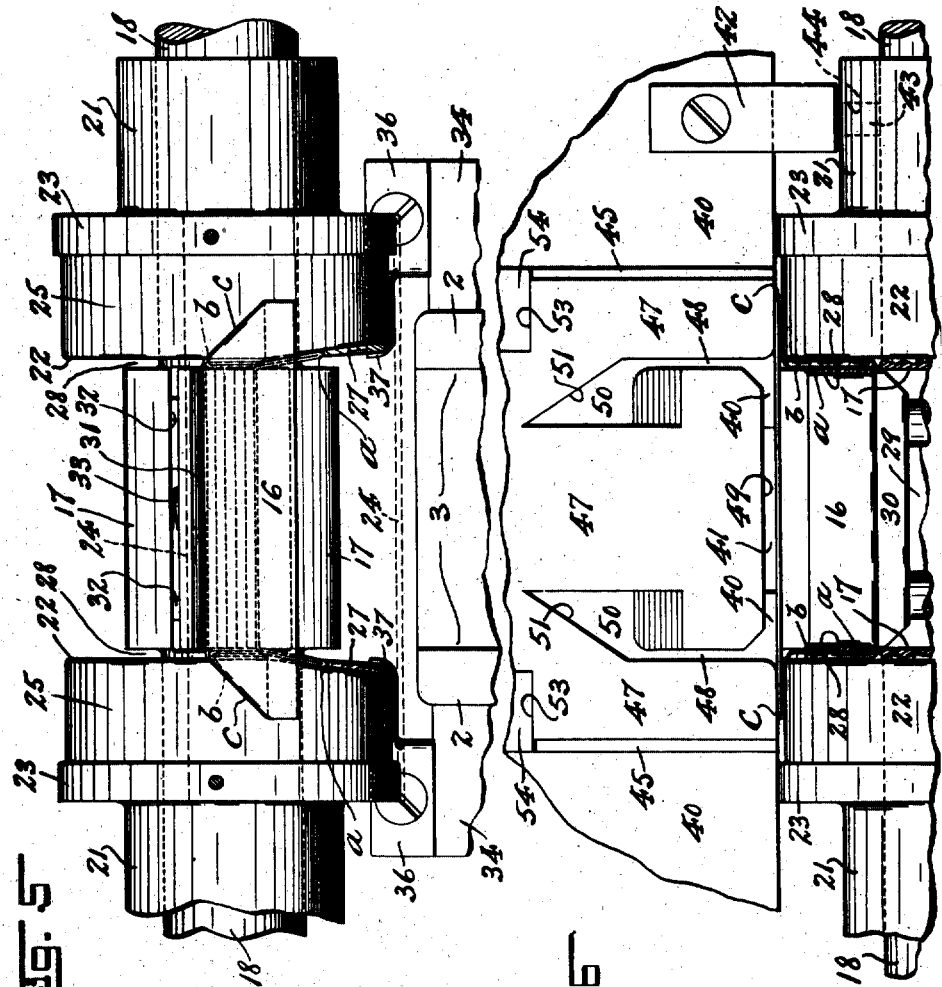

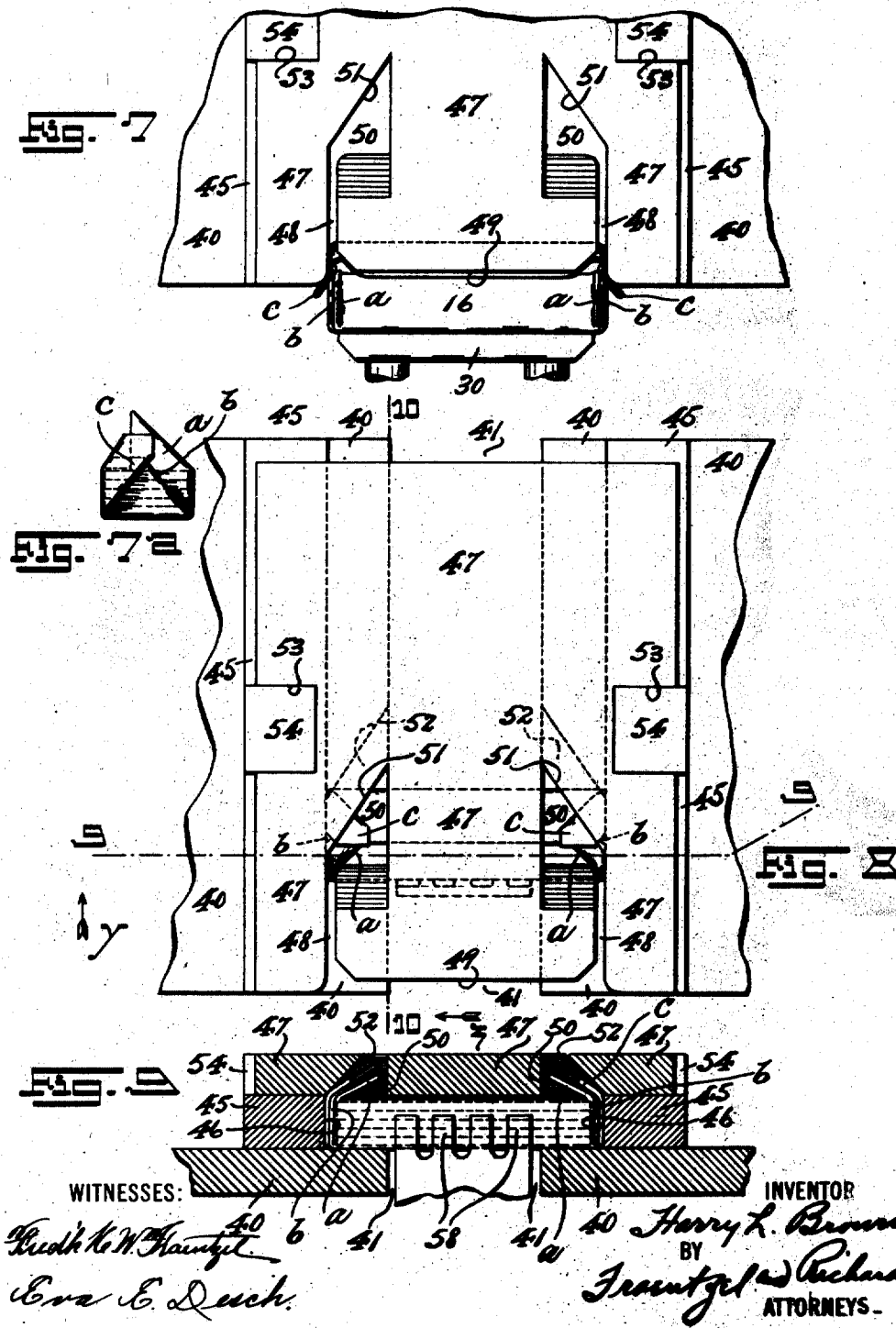

UNITED STATES PATENT OFFICE.

HARRY L. BROWN, OF VERONA, NEW JERSEY, ASSIGNOR TO ANY PACKAGE WRAPPING CO., A CORPORATION OF NEW JERSEY.

WRAPPING-MACHINE.

1,235,547.  Specification of Letters Patent.  Patented Aug. 7, 1917.

Application filed October 26, 1916. Serial No. 127,777.

*To all whom it may concern:*

Be it known that I, HARRY L. BROWN, a citizen of the United States, residing at Verona, in the county of Essex and State of New Jersey, have invented certain new and useful Improvements in Wrapping-Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in automatic wrapping machines; and, the invention relates, more particularly, to a novel construction of apparatus, and the devices and parts thereof by means of which numerous articles, such for example as chewing-gum, candy, soap, and the like, may be suitably wrapped in paper, tin-foil or other suitable covering.

The invention has for its principal object to provide a novel and simple wrapping mechanism adapted to produce a novel sequence of wrapping folds about the article, in such a way that a minimum quantity of paper, or other covering may be used, and yet the several wrapping folds will suffice to fully cover the article, and will not only interlock one with the other so as to render the finished wrapping secure, but will also provide an exceedingly neat and uniform appearance to the wrapped articles.

The invention has for a further object to provide a novel wrapping mechanism adapted to produce the end folds in the sequence to be described, so that each following fold overlaps the preceding fold and thus locks or holds the latter in position against accidental displacement, the last fold made being so disposed as to be secured in folded position by a label band or by adhesive gum, or other desirable means.

Other objects of the present invention, not at this time more particularly enumerated, will be clearly understood from the following detailed description of the present invention.

With the various objects of the present invention in view, the same consists, primarily, in the novel wrapping machine hereinafter set forth; and, furthermore, this invention consists in the novel arrangements and combinations of the various devices and parts, as well as in the details of the construction of the same, all of which will be hereinafter more fully described in the following specification, and then finally embodied in the claims which are appended to and which form an essential part of the specification.

The invention is clearly illustrated in the accompanying drawings, in which:—

Figure 1 is a plan view of that part of a wrapping machine provided with the novel wrapping devices or elements which are made according to and which embody the principles of the present invention.

Figs. 2 and 2ᵃ, taken together, constitute a central longitudinal vertical section of the same.

Fig. 3 is a detail transverse section taken on line 3—3 in said Fig. 1, looking in the direction of the arrow $x$; the same illustrating certain elements of the folding or wrapping devices in normal initial position, the guard or guide plate being removed therefrom and its relation thereto being illustrated by dotted lines; said view is drawn on an enlarged scale.

Fig. 4 is a view similar to Fig. 3, but illustrating the first folding operation; and Fig. 4ᵃ is an end elevation of the article to be wrapped and the wrapper as it appears after the completion of said first folding operation.

Fig. 5 is a top or plan view of the folding elements shown in Fig. 3, but illustrating the second folding operation; and Fig. 5ᵃ is an end elevation of the article to be wrapped and the wrapper as it appears after the completion of said second folding operation.

Fig. 6 is a fragmentary top or plan view, similar to that shown in Fig. 5, but additionally illustrating the relation thereto of a fold turning-plate, and the partially wrapped article being shown moved to the entrance of said fold turning-plate.

Fig. 7 is a fragmentary plan view of said fold turning-plate, showing the partially wrapped article in the course of entering the same, and thus illustrating the third folding operation; and Fig. 7ᵃ is an end elevation of the article to be wrapped and the wrapper as it appears after the completion of said third folding operation.

Fig. 8 is a plan view of said fold turning-plate, showing the operation of the same in completing the last folding operation upon the wrapper of the article to be wrapped; and Fig. 9 is a transverse section therethrough taken on line 9—9 in said Fig. 8, looking in the direction of the arrow y.

Fig. 10 is a longitudinal vertical section through said fold turning-plate, taken on line 10—10 in said Fig. 8, looking in the direction of the arrow z, the wrapped article being removed.

Fig. 11 is a perspective view of the article with the completed wrapping thereupon.

Similar characters of reference are employed in all of the said hereinabove described views, to indicate corresponding parts.

Referring now to the said drawings, the reference character 1 indicates a pair of side-frames upon which the novel wrapping mechanism, made according to and embodying the principles of my present invention is mounted. Supported upon said side-frames 1, so as to bridge across the same, is secured a platform-member 2, the same being channeled to provide a guideway 3 for a reciprocating push-plate 4 supported thereon. Supported upon said platform-member 2, and registered over said guideway 3 is a feed-chute 5 in which the articles 6 to be wrapped are stacked, so as to be delivered within said guideway 3 in front of said push-plate 4.

The means for producing the properly timed reciprocations of said push-plate 4, comprises the following elements:—Journaled in connection with said side-frames 1, so as to extend transversely therebetween, is a rock-shaft 7 to which is secured an upwardly extending lever-arm 8, the upper end of which is pivotally connected by means of coupling-links 9 with a perforated ear or lug 10 depending from the underside of said push-plate 4. Also secured to said rock-shaft 7 is a downwardly extending lever-arm 11, to the free end of which is pivotally secured a connecting-rod 12, the opposite end of which is provided with an eccentric-member 13 operated by the main driving shaft 14, the latter being journaled in connection with said side-frames 1, so as to extend transversely therebetween. Upon the oscillation of the rock-shaft 7 and upwardly extending lever-arm 8, as caused by the eccentric-member 13 and downwardly extending lever-arm 11, the said push-plate 4 is reciprocated forwardly and backwardly in the guideway 3 of the platform-member 2, the latter being provided with a suitable open space or cutaway portion 15 through which the connections between said push-plate and lever-arm 8 extend and move. The forward movement of said push-plate 4 removes from the feed-chute 5 the articles to be wrapped and delivers the same with the wrapping sheet 16 to the mechanism adapted to produce the first wrapping fold, as will be subsequently more fully described.

The reference character 17 indicates a wrapping roll, the journals 18 of which are mounted in suitable bearings 19 affixed to said side-frames 1. One of said journals 18 is provided with a driving gear 20 through which a suitable transmission mechanism (not shown) produces the properly timed rotation of said wrapping roll 17.

Supported upon the journals 18 of said wrapping roll 17, so as to be positioned at each end of the latter and slightly spaced therefrom, are end fold sleeves 21. The inner ends of said sleeves 21, adjacent to said wrapping roll 17, are provided with segmental flange portions 22, the diameter of which is the same as that of said wrapping roll. The outer end of each flange portion 22 is provided with an annular rib 23. Secured by its ends to said annular ribs 23, so as to bridge across said flange portions and the intervening wrapping roll is a guide-plate 24, which as thus positioned, is spaced slightly away from the circumferential surfaces 25 of said flange portions so as to provide an intervening guide-passage 26. The inner end surfaces of said flange portions 22 are provided at their forward portions with chamfered guide-surfaces 27 leading into the intervening fold-passage 28 between the ends of said wrapping roll 17 and the ends of said flange-portions 22.

Said wrapping roll 17 is provided with a diametrically extending opening or slot 29, in which is slidably arranged a sliding bolt or plunger 30. Arranged within said opening or slot 29, adjacent to each open end thereof, is a horizontally disposed spring-pressed plate 31, which is vertically yieldable, and which is supported by bolts 32 slidably arranged in connection with the body of said wrapping roll. Said spring-pressed plates 31 are adapted to yield to the passage into the opening or slot 29 of the article to be wrapped with its wrapper, but will, through the tension of their actuating springs 33, exert a slight gripping action upon the article and its wrapper when disposed within said opening or slot 29, and thus will hold the same firmly during the end folding operations and against accidental displacement, and at the same time will offer sufficient frictional resistance to the entering article and its wrapper, as will tend to force the wrapper snugly and smoothly about the body of the article.

The forward ends of said segmental flange-portions 22, and the forward edge of said guide-plate 24 connected to extend therebetween, terminate in a plane slightly above the entrance to said opening or slot 29 of said wrapping roll 17. Said wrapping roll is positioned adjacent to the delivery end of said guideway 3 of the platform member 2, and its opening or slot 29, when in normal initial horizontal position, is registered with said guideway 3 and the push-plate 4 mounted in the latter.

Secured to said platform-member 2, at its inner end is a bracket-plate 34, provided at its ends with laterally extending members 35 upon which are fixed tucker-blocks 36. Each tucker-block 36 is provided with a pair of inwardly projecting tucker-fingers 37 and 38, between which is an intervening space 39. As thus supported said tucker-fingers are positioned in front of the forward ends of said segmental flange-portions 22, and extend toward the ends of said wrapping roll 17. The upper tucker-fingers 37 are in alinement with the mouth of said opening or slot 29 of said wrapping roll 17, and terminate adjacent to the ends thereof.

The reference character 40 indicates a pair of supporting plates or platforms, which are respectively secured to said side-frames 1 in the rear of said wrapping roll 17. Said supporting plates or platforms 40 extend horizontally toward each other, and are arranged to provide an intervening open space 41 between their opposed ends for purposes subsequently to be disclosed. The upper surface of said supporting plates or platforms 40 lie in the plane of the bottom side of said opening or slot 29 of said wrapping roll 17, so that articles and their wrappers as they are ejected from said opening or slot 29 will be received upon said supporting plates or platforms 40.

Said end fold sleeves 21 and the parts connected therewith are maintained stationary, and against any tendency to rotate with or upon the journals 18 of said wrapping roll 17, upon which they are supported, by means of key-pieces 42, which are fixed upon said supporting plates or platforms 40, and which are provided with key-tongues 43 which project into suitable receiving openings 44 provided in said end fold sleeves 21.

Secured upon the upper surface of said supporting plates or platforms 40 are longitudinally extending ribs 45 between which is provided a guideway 46 for the passage of the article to be wrapped and its wrapper. Supported upon said ribs 45 so as to extend transversely over said guideway 46 is a folder-plate 47. Formed in the forward end of said folder-plate 47 are longitudinally extending slots 48, one of which registers in alinement with each side of said guideway 46. The forward end-portion 49 of said folder-plate, located between said slots 48, provides a longitudinal fold-turning member. Said slots 48 terminate respectively in cutaway portions providing openings or hatches 50 through which the end fold of the wrapper may be turned downwardly. The rearward end 51 of each opening or hatch 50 is inclined obliquely rearward and inward and forms the upper edge of an obliquely disposed turn-over guide-portion 52 which is chamfered through the thickness of said folder-plate 47.

Said folder-plate 47 is maintained in its normal operative position relative to said guideway 46 and the wrapping roll 17 by means of marginal notches 53 provided in its longitudinal sides, and which are adapted to receive holding-studs or blocks 54, which are affixed to and which project upwardly from said ribs 45.

The carrying or propelling means for pushing the article and its wrapper through said folder-plate devices comprises, a reciprocating propeller-bar 55 which is slidably supported upon a pivoted guide-cradle 56, which is pivotally supported on a fulcrum shaft 57 extending between said side-frames 1. Connected with the forward end of said propeller-bar 55 are upwardly extending push-fingers 58, which are adapted to be projected upwardly in front of the article and its wrapper, after the same have been ejected from said wrapping roll 17, so as to engage the same upon a proper operation of said propelling-bar 55, to push the same rearwardly through said folder-plate devices. Said push-fingers 58, at such times move between said supporting plates or platforms 40 within the intervening open space 41. The means for producing the properly timed reciprocations of said propeller-bar 55, comprises the following elements:—Journaled in connection with said side-frames 1, so as to extend transversely therebetween, is a rock-shaft 59 to which is secured an upwardly extending lever-arm 60, the upper end of which is pivotally connected by means of coupling-links 61 with a perforated lug or ear 62 connected with the rearward end of said propeller bar 55. Also secured to said rock-shaft 59 is a downwardly extending lever-arm 63, to the free end of which is pivotally secured a connecting-rod 64, the opposite end of which is provided with an eccentric-member 65 operated by said main driving-shaft 14. Upon the oscillation of said rock-shaft 59 and upwardly extending lever-arm 60, as caused by the downwardly extending lever-arm 63 and eccentric-member 65, the said propeller-bar 55 and its push-fingers 58 are reciprocated in the guide-cradle 56, and the push-fingers, on the backward movement engage and push the article and its wrapper through said folder-plate devices.

Upon the backward or propelling movement of said propeller-bar 55 and its push-fingers 58, said push-fingers must be maintained in contact with said article and its wrapper so as to properly move the same entirely through the folder-plate devices and then to such other mechanism as it may be desired to deliver the same to, such for example as a banding roll (not shown), but after this is accomplished said push-fingers must be returned to normal initial position in front of another article and its wrapper, which has in the meantime been delivered from said wrapping roll 17 to said folder-plate devices, and to so do must be lowered so as to pass beneath the waiting article and its wrapper, and then raised again into normal propelling position. To accomplish this end the following mechanism is provided:—Pivotally connected with the free or oscillating end of said guide-cradle 56 is a yoke-frame 66 having on one side an upper laterally projecting roller 67 and on the other side a lower laterally projecting roller 68. Said yoke-frame 66 straddles said main shaft 14. Secured upon said main driving shaft 14 at one side of said yoke-frame 66 so as to engage operatively with said upper roller 67 is a lifting cam-member 69, and secured upon said driving shaft 14, at the other side of said yoke-frame 66 so as to operatively engage with said lower roller 68 is a lowering cam-member 70. Said cams are set to work oppositely, so that when the high part of one cam is operatively engaging its roller the low part of the other cam is operatively engaging its roller. As will be readily understood the lifting cam-member 69 lifts upward said yoke-frame 66 and consequently said guide-cradle 56, so as to position said push-fingers 58 in operative propelling position, maintaining the same in normal propelling plane while the propeller-bar 55 is being moved rearwardly in said guide-cradle. At the end of the normal propelling movement of said propeller-bar 55 and its push-fingers 58, the low part of the lifting cam-member 69 approaches and engages the upper roller 67, and at the same time the high part of the lowering cam-member 70 approaches and engages the lower roller 68, consequently said yoke-frame 66 is caused to move downward, thus in turn causing the forward end of said guide-cradle 56 to be oscillated downwardly from its pivoted connection, thus inclining downwardly the said guide-cradle 56 while the propeller-bar 55 and its push-fingers 58 are moving forwardly therein. It follows, therefore, that as said push-fingers 58 move forwardly they are also carried downwardly so as to pass beneath the waiting article and its wrapper, which have been delivered in the meantime from said wrapping roll 17 to said folder-plate device, and as soon as the same have been passed beneath the article and its wrapper, the high part of the lifting cam-member 69 again engages the upper roller 67 to to lift said yoke-frame 66 and said guide-cradle 56, and thus again project said push-fingers 58 in normal initial propelling position in front of said waiting article and its wrapper. Of course it will be understood that said cam-members are so positioned or set upon said driving-shaft 14 that their operations are performed in proper timed relation to the movements of the eccentric-members 13 and 65, and consequently in proper timed relation to the propelling movements of the devices by means of which the articles and their wrappers are propelled through the wrapping devices above described.

Having thus described in detail the mechanical construction of the novel wrapping devices and mechanism operating the same, the manner in which they act upon the articles to be wrapped and their wrappers may be described as follows:—Upon the forward movement of said push-plate 4, the same is carried into engagement with the articles 6 at the lower end of the feed-chute 5, and removes the required number thereof, carrying the same through the guideway 3 toward the wrapping roll 17. In the meantime a wrapper 16 has been fed down between the end of the guideway 3 and in front of the tucker-fingers 37 and 38 and the opening or slot 29 of the wrapping roll 17, so that the same is properly positioned in the path of the advancing articles 6. The continued movement of said push-plate 4 carries said articles 6 into contact with said wrapper 16, thereby propelling the articles and wrapper together past the tucker-fingers 37 and 38 and then into the opening or slot 29 of the roll 17. This operation causes the lower longitudinal marginal edge of the wrapper 16 to engage the lower lip of the mouth of the opening 29, thereby folding the same longitudinally beneath the articles 6. At the same time the upper longitudinal marginal portion of the wrapper 16 is engaged by the lower edge of said guide-plate 24, and then by the upper lip of the mouth of the opening or slot 29, thereby folding the same downwardly over the top of the articles 6. As these operations take place the side marginal edges of the wrapper 16 are carried past the tucker-fingers 37 and 38, and the upper tucker-finger 37 tucks inwardly against the ends of the articles 6 a portion of said side marginal edges of the wrapper, and at the same time the ends of the lower longitudinal marginal edge of the wrapper is guided to lie against one side of the tuck by engagement with said lower tucker-finger 38, thus forming an end-fold —a— which passes between the tucker-fingers 37 and 38 through the intervening space 39, and in like manner the ends of the upper longitudinal marginal edge of the wrapper is guided to lay against the other side of the tuck by engagement with the lower edge of said guide-plate 24, thus forming an end-fold —b— which passes between the tucker-finger 37 and the edge of said guide-plate 24. The result of these operations is illustrated more particularly in Figs. 4 and 4ᵃ of the drawings.

Upon the completion of the above described operation the articles 6 and the wrapper 16 have been properly deposited within the opening 29 of said wrapping-roll, and the push-plate 4 is retracted to normal initial position. The wrapping roll is now caused to make a half revolution. The rotation of said wrapping roll carries the end fold —b— into engagement with the guide-surfaces 27 of the flange-portions 22 of the end-fold sleeves 21, and thus turns the said end fold —b— over against the end of the articles 6 so that the same will pass through the end fold passage 28 between the ends of the wrapping roll and the flange-portions 22. Simultaneously this rotary movement of the wrapping roll carries the free upper marginal longitudinal edge of the wrapper 16 beneath said guide-plate 24, thereby folding a portion of the same longitudinally over the remaining exposed side of the articles 6, at the same time the ends of said longitudinal marginal edge of the wrapper are engaged by the circumferential surface 25 of the flange-portions 22, and are thus caused to form a third end-fold —c— which rides up into and through the guide-passage 26 between said surface 25 and said guide-plate 24. As the wrapping roll continues its rotation, the endfolds —a— are also carried into engagement with said guide-surfaces 27, and are thus turned into said end-fold passages 28, thereby turning said end-folds —a— outwardly at right angles to the ends of the articles 6. The result of these operations is illustrated, more particularly, in Figs. 5 and 5ᵃ of the drawings.

When the half revolution of the wrapping roll has been completed the partially wrapped articles are presented opposite the entrance to the end-fold plate device 47. As another wrapper with the articles to be wrapped is introduced into the forward side of the opening or slot 29 of the wrapping roll, the same engages the bolt or plunger 30, which is located within the opening or slot 29, and by pushing the same rearward, causes the same to engage and then eject said partially wrapped articles from the wrapping-roll, thence pushing the same within the guideway 46 beneath the end-fold plate 47; as is illustrated more particularly in Figs. 6 and 7 of the drawings. In passing beneath the forward end-portion 49 of the end-fold plate 47, the remaining portion of the free longitudinal marginal edge of the wrapper 16 is folded longitudinally down over the articles 6, and at the same time the end folds —c— are engaged by the ribs 45 bounding the guideway 46 and are thus folded over the ends of the articles 6, as illustrated in Fig. 7ᵃ of the drawings. The free ends of the respective end-folds —a—, —b— and —c— enter the slots 48, as they stand projecting upwardly from the ends against which they fold. After having thus been delivered beneath the end-fold plate 47, the partially wrapped article is engaged by the push-fingers 58 and moved thereby onwardly through the passage 46. Such movement causes the upstanding portions of said end-folds to be carried into engagement with the obliquely disposed turn-over guide-portions 52 formed in said end-fold plate 47, which as the folds move beneath the same, turns said folds downwardly through the hatches 50 and over the up-turned surface of the wrapped articles, and thus completes the wrapping operations, the articles being then completely enveloped in the wrapper which is folded as illustrated in Fig. 11 of the drawings. The wrapped articles may now be passed to a banding or labeling apparatus or device, or may be otherwise disposed of as may be desired.

It will be understood from the above description and an inspection of the accompanying drawings, that the respective end-folds —a—, —b— and —c— successively overlap one another, thus holding the end-folds —a— and —b— firmly in position by means of the overlapping end-fold c, which in turn may be either held down by adhesive or by the engagement of a label-band applied to the wrapped package. Such an arrangement of end-folds is new in the art, and affords a very tightly and snugly wrapped package of exceedingly neat appearance, and, furthermore, permits of the use of a minimum amount of paper, tin-foil or other material serving as the wrapper.

I am aware that changes may be made in the general arrangements and combinations of the various devices and parts, as well as in the details of the construction of the same, without departing from the scope of my present invention as set forth in the foregoing specification, and as defined in the appended claims. Hence, I do not limit my invention to the exact arrangements and combinations of the devices and parts as described in the said specification, nor do I confine myself to the exact details of the construction of said parts as illustrated in the accompanying drawings.

I claim:—

1. In a wrapping machine the combination with a rotary wrapping roll having a goods receiving opening therethrough of stationary tucker-fingers adjacent to the ends of the receiving mouth of said goods receiving opening, stationary end-fold guiding means with which said wrapping roll coöperates, and an end-fold turn-over plate at the rear of said wrapping roll beneath which the partially wrapped goods are passed upon ejection from said wrapping roll.

2. In a wrapping machine the combination with a rotary wrapping roll having a transverse goods receiving opening therethrough, the sides of which adjacent to its respective mouths are open, of means for inserting goods to be wrapped and a wrapper within said goods receiving opening, stationary tucker-fingers located at the forward side of said wrapping roll adjacent to the open sides of the mouth of said goods receiving opening, stationary end-fold guiding means located at each end of said wrapping roll and spaced therefrom to provide a vertical intervening end-fold guide-way or passage, a guide-plate extending horizontally over said end-fold guiding means and spaced slightly from the surface thereof to provide a horizontal intervening end-fold guide-way or passage, a receiving guide-way corresponding in width to the length of the wrapped goods situated in the rear of said wrapping roll, means within said goods receiving opening for ejecting the goods and wrapper from said wrapping roll into said receiving guideway, and an end-fold turn-over plate located over said receiving guideway beneath which the partially wrapped goods are passed, said turn-over plate having means for turning downward over the partially wrapped goods the formed end-folds of the wrapper to complete the wrapping operation.

3. In a wrapping machine the combination with a rotary wrapping roll having a transverse goods receiving opening therethrough, the sides of which adjacent to its respective mouths are open, of means for inserting goods to be wrapped and a wrapper within said goods receiving opening, stationary tucker-fingers located at the forward side of said wrapping roll adjacent to the open sides of the mouth of said goods receiving opening, stationary end-fold guiding means located at each end of said wrapping roll and spaced therefrom to provide a vertical intervening end-fold guide-way or passage, a guide-plate extending horizontally over said end-fold guiding means and spaced slightly from the surface thereof to provide a horizontal intervening end-fold guide-way or passage, a receiving guide-way corresponding in width to the length of the wrapped goods situated in the rear of said wrapping roll, means within said goods receiving opening for ejecting the goods and wrapper from said wrapping roll into said receiving guide-way, an end-fold turn-over plate located over said receiving guideway beneath which the partially wrapped goods are passed, said turn-over plate having means for turning downward over the partially wrapped goods the formed end-folds of the wrapper to complete the wrapping operation, and means for propelling the goods through said guideway and beneath said end-fold turn-over plate.

4. In a wrapping machine, a rotary wrapping roll having a diametrically disposed goods receiving opening, the sides of which adjacent to its respective mouths are open, means for inserting goods to be wrapped and a wrapper within said goods receiving opening, transverse stationary tucker-fingers horizontally alined with the mouth of said goods receiving opening and projecting toward the open sides thereof, means above and below said tucker-fingers and coöperating therewith to form end-folds in said wrapper bounding the tucks produced by said tucker-fingers, stationary end-fold guiding means with which said wrapping roll coöperates, and an end-fold turn-over plate at the rear of said wrapping roll beneath which the partially wrapped goods are passed upon ejection from said wrapping roll.

5. In a wrapping machine, a rotary wrapping roll having a diametrically disposed goods receiving opening, the sides of which adjacent to its respective mouths are open, means for inserting goods to be wrapped and a wrapper within said goods receiving opening, transverse stationary tucker-fingers horizontally alined with the mouth of said goods receiving opening and projecting toward the open sides thereof, means above and below said tucker-fingers and coöperating therewith to form end-folds in said wrapper bounding the tucks produced by said tucker-fingers, stationary end-fold guiding means with which said wrapping roll coöperates, a receiving guideway, corresponding in width to the length of the wrapped goods situated in the rear of said wrapping roll, means within said goods receiving opening for ejecting the goods and wrapper from said wrapping roll into said receiving guideway, and an end-fold turn-over plate extending over said receiving guideway beneath which said partially wrapped goods are passed, said turn-over plate having means for turning downward over the partially wrapped goods the formed end-folds of the wrapper to complete the wrapping operation.

6. In a wrapping machine, a rotary wrapping roll having a diametrically disposed goods receiving opening, the sides of which adjacent to its respective mouths are open, means for inserting goods to be wrapped and a wrapper within said goods receiving opening, transverse stationary tucker-fingers horizontally alined with the mouth of said goods receiving opening and projecting toward the open sides thereof, means above and below said tucker-fingers and coöperating therewith to form end-folds in said wrapper bounding the tucks produced by said tucker-fingers, stationary end-fold guiding means with which said wrapping roll coöperates, a receiving guideway corresponding in width to the length of the wrapped goods situated in the rear of said wrapping roll, means within said goods receiving opening for ejecting the goods and wrapper from said wrapping roll into said receiving guideway, an end-fold turn-over plate extending over said receiving guideway beneath which said partially wrapped goods are passed, said turn-over plate having means for turning downward over the partially wrapped goods the formed end-folds of the wrapper to complete the wrapping operation, and means for propelling the goods through said guideway and beneath said end-fold turn-over plate.

7. In a wrapping machine, a rotary wrapping roll having a diametrically disposed goods receiving opening a portion of the sides of which adjacent to its respective mouths are open, stationary means situated in front of said wrapping roll for tucking a wrapper against the ends of goods entering said receiving opening and thus forming longitudinally extending first and second end-folds, end-fold guiding means having vertical guide-surfaces spaced slightly from the ends of said wrapping roll adapted to engage and turn said first and second end-folds into the plane of the end surface of the goods when said wrapping roll is rotated, said guiding means having cylindrical guide-surfaces, a guide-plate extending over said cylindrical guide-surfaces and spaced therefrom to provide a passage concentric to the axis of said wrapping roll, said cylindrical guide-surfaces and said guide-plate coöperating to form third end-folds in said wrapper when said wrapping roll is rotated, and means exterior of said wrapping roll through which the goods are passed adapted to overlap said end-folds and then turn the same downwardly over the top-surface of the enveloped goods.

8. In a wrapping machine, a rotary wrapping roll having a diametrically disposed goods receiving opening a portion of the sides of which adjacent to its respective mouths are open, stationary means situated in front of said wrapping roll for tucking a wrapper against the ends of goods entering said receiving opening and thus forming longitudinally extending first and second end-folds, end-fold guiding means having vertical guide-surfaces spaced slightly from the ends of said wrapping roll adapted to engage and turn said first and second end-folds into the plane of the end surface of the goods when said wrapping roll is rotated, said guiding means having cylindrical guide-surfaces, a guide-plate extending over said cylindrical guide-surfaces and spaced therefrom to provide a passage concentric to the axis of said wrapping roll, said cylindrical guide-surfaces and said guide-plate coöperating to form third end-folds in said wrapper when said wrapping roll is rotated, means within said goods receiving opening adapted to eject the goods after said wrapping roll is rotated, a receiving guideway corresponding in width to the length of the wrapped goods into which the goods are received from said wrapping roll, the sides of said receiving guideway being adapted to engage said third end-folds and turn the same over into the plane of the end surface of the goods, an end-fold plate extending over said receiving guideway, said end-fold plate having slots alined with the sides of said receiving guideway and hatches at the inner ends of said slots, and obliquely disposed turn-over guide-portions formed in said end-fold plate adapted to engage said end-folds to turn the same downward through said hatches and then over the wrapped goods to complete the wrapping operations.

9. In a wrapping machine, a rotary wrapping roll having a diametrically disposed goods receiving opening a portion of the sides of which adjacent to its respective mouths are open, stationary means situated in front of said wrapping roll for tucking a wrapper against the ends of goods entering said receiving opening and thus forming longitudinally extending first and second end-folds, end-fold guiding means having vertical guide-surfaces spaced slightly from the ends of said wrapping roll adapted to engage and turn said first and second end-folds into the plane of the end surfaces of the goods when said wrapping roll is rotated, said guiding means having cylindrical guide-surfaces, a guide-plate extending over said cylindrical guide-surfaces and spaced therefrom to provide a passage concentric to the axis of said wrapping roll, said cylindrical guide-surfaces and said guide-plate coöperating to form third end-folds in said wrapper when said wrapping roll is rotated, and means exterior of said wrapping roll through which the goods are passed adapted to overlap said end-folds and then turn the same downwardly over the top-surfaces of the enveloped goods, means for inserting goods to be wrapped and a wrapper within said goods-receiving opening, and means for propelling the goods through said receiving guideway after ejection from said wrapping roll.

10. In a wrapping machine, a rotary wrapping roll having a diametrically disposed goods receiving opening a portion of the sides of which adjacent to its respective mouths are open, stationary means situated in front of said wrapping roll for tucking a wrapper against the ends of goods entering said receiving opening and thus forming longitudinally extending first and second end-folds, end-fold guiding means having vertical guide-surfaces spaced slightly from the ends of said wrapping roll adapted to engage and turn said first and second end-folds into the plane of the end surface of the goods when said wrapping roll is rotated, said guiding means having cylindrical guide-surfaces, a guide-plate extending over said cylindrical guide-surfaces and spaced therefrom to provide a passage concentric to the axis of said wrapping roll, said cylindrical guide-surfaces and said guide-plate coöperating to form third end-folds in said wrapper when said wrapping roll is rotated, means within said goods receiving opening adapted to eject the goods after said wrapping roll is rotated, a receiving guideway corresponding in width to the length of the wrapped goods into which the goods are received from said wrapping roll, the sides of said receiving guideway being adapted to engage said third end-folds and turn the same over into the plane of the end surface of the goods, an end-fold plate extending over said receiving guideway, said end-fold plate having slots alined with the sides of said receiving guideway and hatches at the inner ends of said slots, and obliquely disposed turn-over guide-portions formed in said end-fold plate adapted to engage said end-folds to turn the same downward through said hatches and then over the wrapped goods to complete the wrapping operations, means for inserting goods to be wrapped and a wrapper within said goods-receiving opening, and means for propelling the goods through said receiving guideway after ejection from said wrapping roll.

11. In a wrapping machine, a rotary wrapping roll having a diametrically disposed goods receiving opening a portion of the sides of which adjacent to the mouths thereof are open, a pair of stationary tucker-fingers located adjacent to the ends of said wrapping roll on the forward side thereof, the upper tucker-fingers of each pair thereof being in longitudinal alinement with the mouth of said goods receiving opening, the lower tucker-fingers of each pair thereof being spaced from the upper tucker-fingers to provide an intervening space therebetween, end-fold guiding and folding means comprising segmental portions providing cylindrical guide-surfaces coinciding with the cylindrical surface of said wrapping roll and vertical end guide surfaces spaced slightly from the ends of said wrapping roll, the forward portions of said vertical end guide surfaces being chamfered to cause the same to diverge slightly from the ends of said wrapping-roll, annular ribs formed on said segmental portions, a transverse guide-plate extending between said ribs and spaced slightly from said cylindrical guide-surfaces to form an intervening guide-passage, and means for securing said segmental portions in stationary relation to said wrapping roll.

12. In a wrapping machine, a rotary wrapping roll having a diametrically disposed goods receiving opening a portion of the sides of which adjacent to the mouths thereof are open, a pair of stationary tucker-fingers located adjacent to the ends of said wrapping roll on the forward side thereof, the upper tucker-fingers of each pair thereof being in longitudinal alinement with the mouth of said goods receiving opening, the lower tucker-fingers of each pair thereof being spaced from the upper tucker-fingers to provide an intervening space therebetween, end-fold guiding and folding means comprising segmental portions providing cylindrical guide-surfaces coinciding with the cylindrical surface of said wrapping roll and vertical end guide surfaces spaced slightly from the ends of said wrapping roll, the forward portion of said vertical end guide surfaces being chamfered to cause the same to diverge slightly from the ends of said wrapping-roll, annular ribs formed on said segmental portions, a transverse guide-plate extending between said ribs and spaced slightly from said cylindrical guide-surfaces to form an intervening guide-passage, means for securing said segmental portions in stationary relation to said wrapping roll, means for inserting goods to be wrapped and a wrapper within the goods receiving opening of said wrapping roll, and a sliding plunger within said goods receiving opening adapted to eject the partially wrapped goods from said wrapping roll.

13. In a wrapping machine, a rotary wrapping roll having a diametrically disposed goods receiving opening a portion of the sides of which adjacent to the mouths thereof are open, a pair of stationary tucker-fingers located adjacent to the ends of said wrapping roll on the forward side thereof, the upper tucker-fingers of each pair thereof being in longitudinal alinement with the mouth of said goods receiving opening, the lower tucker-fingers of each pair thereof being spaced from the upper tucker-fingers to provide an intervening space therebetween, end-fold guiding and folding means comprising segmental portions providing cylindrical guide-surfaces coinciding with the cylindrical surface of said wrapping roll and vertical end guide surfaces spaced slightly from the ends of said wrapping roll, the forward portion of said vertical end guide surfaces being chamfered to cause the same to diverge slightly from the ends of said wrapping-roll, annular ribs formed on said segmental portions, a transverse guide-plate extending between said ribs and spaced slightly from said cylindrical guide-surfaces to form an intervening guide-passage, means for securing said segmental portions in stationary relation to said wrapping roll, means for inserting goods to be wrapped and a wrapper within the goods receiving opening of said wrapping roll, a sliding plunger within said goods receiving opening adapted to eject the partially wrapped goods from said wrapping roll, a receiving guideway into which the partially wrapped goods are ejected from said wrapping-roll, and an end-fold plate extending over said receiving guideway having means for engaging the formed end-folds of the goods wrapper and turning the same downwardly over the enveloped goods.

14. In a wrapping machine, a rotary wrapping roll having a diametrically disposed goods receiving opening a portion of the sides of which adjacent to the mouths thereof are open, a pair of stationary tucker-fingers located adjacent to the ends of said wrapping roll on the forward side thereof, the upper tucker-fingers of each pair thereof being in longitudinal alinement with the mouth of said goods receiving opening, the lower tucker-fingers of each pair thereof being spaced from the upper tucker-fingers to provide an intervening space therebetween, end-fold guiding and folding means comprising segmental portions providing cylindrical guide-surfaces coinciding with the cylindrical surface of said wrapping roll and vertical end guide-surfaces spaced slightly from the ends of said wrapping roll, the forward portion of said vertical end guide surfaces being chamfered to cause the same to diverge slightly from the ends of said wrapping roll, annular ribs formed on said segmental portions, a transverse guide-plate extending between said ribs and spaced slightly from said cylindrical guide-surfaces to form an intervening guide-passage, means for securing said segmental portions in stationary relation to said wrapping roll, means for inserting goods to be wrapped and a wrapper within the goods receiving opening of said wrapping roll, a sliding plunger within said goods receiving opening adapted to eject the partially wrapped goods from said wrapping roll, a receiving guideway into which the partially wrapped goods are ejected from said wrapping-roll, an end-fold plate extending over said receiving guideway having means for engaging the formed end-folds of the goods wrapper and turning the same downwardly over the enveloped goods, comprising end-fold receiving slots formed in said end-fold plate which is further provided with hatches into which said slots lead, and obliquely disposed turn-over guide-portions formed in said end-fold adjacent to said hatches.

15. In a wrapping machine, a rotary wrapping roll having a diametrically disposed goods receiving opening a portion of the sides of which adjacent to the mouths thereof are open, a pair of stationary tucker-fingers located adjacent to the ends of said wrapping roll on the forward side thereof, the upper tucker-fingers of each pair thereof being in longitudinal alinement with the mouth of said goods receiving opening, the lower tucker-fingers of each pair thereof being spaced from the upper tucker-fingers to provide an intervening space therebetween, end-fold guiding and folding means comprising segmental portions providing cylindrical guide-surfaces coinciding with the cylindrical surface of said wrapping roll and vertical end guide surfaces spaced slightly from the ends of said wrapping roll, the forward portion of said vertical end guide surfaces being chamfered to cause the same to diverge slightly from the ends of said wrapping-roll, annular ribs formed on said segmental portions, a transverse guide-plate extending between said ribs and spaced slightly from said cylindrical guide-surfaces to form an intervening guide-passage, means for securing said segmental portions in stationary relation to said wrapping-roll, means for inserting goods to be wrapped and a wrapper within the goods receiving opening of said wrapping-roll, a sliding plunger within said goods receiving opening adapted to eject the partially wrapped goods from said wrapping roll, a receiving guideway into which the partially wrapped goods are ejected from said wrapping-roll, an end-fold plate extending over said receiving guideway having means for engaging the formed end-folds of the goods wrapper and turning the same downwardly over the enveloped goods, and means for propelling the goods through said receiving guideway and in operative relation to said end-fold plate.

16. In a wrapping machine, a rotary wrapping roll having a diametrically disposed goods receiving opening a portion of the sides of which adjacent to the mouths thereof are open, a pair of stationary tucker-fingers located adjacent to the ends of said wrapping roll on the forward side thereof, the upper tucker-fingers of each pair thereof being in longitudinal alinement with the mouth of said goods receiving opening, the lower tucker-fingers of each pair thereof being spaced from the upper tucker-fingers to provide an intervening space therebetween, end-fold guiding and folding means comprising segmental portions providing cylindrical guide-surfaces coinciding with the cylindrical surface of said wrapping roll and vertical end guide surfaces spaced slightly from the ends of said wrapping roll, the forward portion of said vertical end guide surfaces being chamfered to cause the same to diverge slightly from the ends of said wrapping-roll, annular ribs formed on said segmental portions, a transverse guide-plate extending between said ribs and spaced slightly from said cylindrical guide-surfaces to form an intervening guide-passage, means for securing said segmental portions in stationary relation to said wrapping roll, means for inserting goods to be wrapped and a wrapper within the goods receiving opening of said wrapping roll, a sliding plunger within said goods receiving opening adapted to eject the partially wrapped goods from said wrapping roll, a receiving guideway into which the partially wrapped goods are ejected from said wrapping-roll, an end-fold plate extending over said receiving guideway having means for engaging the formed end-folds of the goods wrapper and turning the same downwardly over the enveloped goods, comprising end-fold receiving slots formed in said end-fold plate which is further provided with hatches into which said slots lead, obliquely disposed turn-over guide-portions formed in said end-fold plate adjacent to said hatches, and means for propelling the goods through said receiving guideway and in operative relation to said end-fold plate.

In testimony, that I claim the invention set forth above I have hereunto set my hand this 24th day of October, 1916.

HARRY L. BROWN.

Witnesses:
GEORGE D. RICHARDS,
FRED'K H. W. FRAENTZEL.